B. ACKERMAN.
BALING MANURE.
No. 183,617.  Patented Oct. 24, 1876.
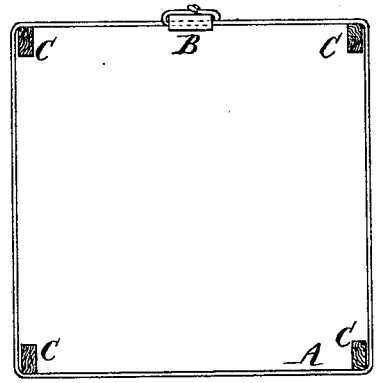
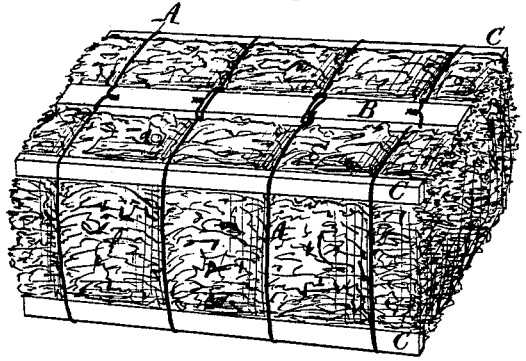
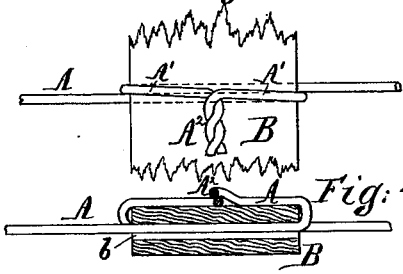
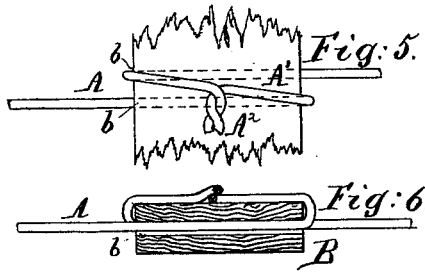
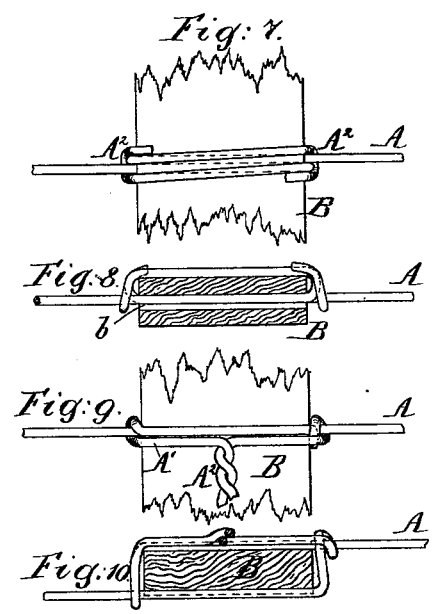
Witnesses:
C. C. Stetson
A. Henry Gentner
Inventor:
B. Ackerman
by his attorney
J. D. Stetson
New York

UNITED STATES PATENT OFFICE.

BERNARD ACKERMAN, OF NEW YORK, N. Y.

IMPROVEMENT IN BALING MANURE.

Specification forming part of Letters Patent No. 183,617, dated October 24, 1876; application filed September 19, 1876.

*To all whom it may concern:*

Be it known that I, BERNARD ACKERMAN, of New York city, in the State of New York, have invented certain new and useful Improvements Relating to Baling Manure and other material, of which the following is a specification:

It is found that the stowage and transportation of stable-manure may be facilitated by compressing the fresh material into bales. The exterior soon dries and becomes relatively inodorous, and the compression is found to retard the escape of ammonia, and is believed to greatly improve the quality of the finally rotted and mellowed product; but the slight tenacity of the material renders the bales liable to break in handling. I overcome the difficulty by attaching all the bands of a bale to a stout piece of wood, or other suitable material, extending longitudinally of the bale, preferably along the middle of one of the faces. I will call this the upper surface of the bale, although it is obviously one of the sides, when the bale is in process of manufacture in a press with an upright motion.

In lifting the bale by hooks, the hooks may be applied to the longitudinal piece. The latter will usually lie with a great portion, or the whole, of its thickness outside of the general surface of the bale. It there performs a useful function in holding the bales apart and promoting ventilation and drying. This is the more important in case other sticks are inserted, as I prefer to do at or near the corners of the bale, which further strengthens it. Such sticks prevent the wires or other bands from grooving the bale as much as they would otherwise do. The grooves are useful in promoting ventilation; but the connecting-stick standing outside of the face of the bale usually obviates the necessity therefor.

The following is a description of what I consider the best means of carrying out the invention.

The accompanying drawings form a part of this specification.

Figure 1 is an end view of the connecting-stick with one or more bands in position, as if extending around a bale. The contents of the bale are not represented. Fig. 2 is a perspective view of a bale complete.

It will be understood that the bales may be of equal breadth and depth, or variously proportioned in that respect.

Figs. 3 and 4 represent the point of junction of the longitudinal stick with a cross-tie on a larger scale. Fig. 3 is a plan view, and Fig. 4 a vertical section.

The succeeding figures represent modifications, Figs. 5, 7, and 9 being plan views, and Figs. 6, 8, and 10 corresponding vertical sections.

Similar letters of reference indicate corresponding parts in all the figures.

The bands are marked A, with additional marks $A^1$, &c., for the fastening ends. B is the longitudinal stick, to which all the bands A are secured. C C are loose longitudinal sticks, applied in addition.

In baling the material, it is treated, in all respects, in the ordinary manner in the press, (the proper sticks C being placed above and below it,) until the bands are being applied. Then, instead of simply uniting the ends of the bands together, and leaving them entirely independent, each band of its neighbor, the connecting-stick B is held up by any suitable means at about the midheight of the bale, and the bands are separately attached to it and suitably tightened.

Referring to Figs. 3 and 4, the bands A are inserted in opposite directions through a hole, $b$, in the stick B, and having been drawn through as tightly as practicable with the hands, or with any suitable appliances, the ends $A^1$ are brought into contact on the outer face of the stick B, and strongly twisted together, as indicated by $A^2$.

Referring to Figs. 5 and 6, the same construction is shown, except that the bands are introduced in opposite directions, not through the same hole $b$, but through adjacent holes similarly marked.

Referring to Figs. 7 and 8, the bands are passed in the opposite direction through the same hole $b$, corresponding in this respect to Figs. 3 and 4; but they are afterward secured not by twisting their ends together, but by hooking their ends respectively around the main wire, as indicated by $A^2$.

In the modification shown in Figs. 9 and 10, the longitudinal stick B has no hole. Instead of that, the exterior is slightly grooved across at the proper places, to allow the bands A to sink therein. One end of the band is passed through the groove on the inner face of the stick B, and the other is laid in the groove on the outer face. The end $A^1$ of the latter band is passed under the main wire, and brought back to the outer face of the stick B. The opposite end is bent around the main wire in the form which nautical men would describe as "taking a turn." Then the final ends of both are twisted together on the outer face of the stick B, as indicated by $A^2$.

It is well in all the cases to beat down or bend out of the way the twisted end $A^2$ of the wires. The twist may be formed, if preferred, at the edge, instead of on the outer face of the stick B. In case it is formed at the edge, it is easier to turn it inward, so that it is not liable to be disturbed in afterward handling the bales.

Many other modifications of the fastening may be made by any good mechanic, it being only essential that the ends of the bands be secured to the stick B in such manner as to unite them strongly thereto, and enable them to resist displacement thereon in case of any ordinary or extraordinary violence, and also to firmly hold together the baled material.

I claim as my invention—

1. A bale having a longitudinal piece, B, as shown, firmly united to the several bands or ties A, by passing the said ties through or around the same, and securing their ends, substantially as and for the purposes herein specified.

2. A bale of manure or analogous material, having bands or ties A connected to a longitudinal piece, B, by passing through or around the same, and having additional longitudinal pieces C at or near the corners, substantially as herein specified.

In testimony whereof I have hereunto set my hand this 14th day of September, 1876, in the presence of two subscribing witnesses.

BERNARD ACKERMAN.

Witnesses:
 CHAS. C. STETSON,
 A. HENRY GENTNER.